United States Patent [19]

Morgan

[11] Patent Number: 4,526,689
[45] Date of Patent: Jul. 2, 1985

[54] IN-LINE STRAINER

[76] Inventor: Howard W. Morgan, P.O. Box 735, Michigan City, Ind. 46360

[21] Appl. No.: 636,084

[22] Filed: Aug. 1, 1984

Related U.S. Application Data

[63] Continuation of Ser. No. 510,276, Jul. 1, 1983, abandoned, which is a continuation of Ser. No. 362,872, Mar. 29, 1982, abandoned.

[51] Int. Cl.$^3$ ............................................. B01D 29/10
[52] U.S. Cl. ................................ 210/323.2; 210/345; 210/455; 210/456; 210/477
[58] Field of Search .................... 210/455, 456, 323.1, 210/232, 323.2, 435, 477, 451, 484, 446, 345, 447, 448; 55/350, 484

[56] References Cited

U.S. PATENT DOCUMENTS

| | | | |
|---|---|---|---|
| 1,619,118 | 3/1927 | Guy et al. | 210/232 |
| 2,667,272 | 1/1954 | Tursky | 210/168 |
| 2,765,084 | 10/1956 | Tursky | 210/184 |
| 3,170,873 | 2/1965 | May . | |
| 3,319,793 | 5/1967 | Miller, Jr. et al. | 210/497.1 |
| 3,502,214 | 3/1970 | Mills et al. | 210/136 |
| 3,503,516 | 3/1970 | Harms et al. | 210/232 |
| 3,524,548 | 8/1970 | McDonald et al. | 210/153 |
| 3,774,769 | 11/1973 | Smith | 210/232 |
| 3,814,261 | 6/1974 | Morgan, Jr. | 210/445 |
| 3,819,052 | 6/1974 | Firth | 210/85 |
| 3,959,137 | 5/1976 | Kirsgalvis | 210/84 |
| 4,022,693 | 5/1977 | Morgan, Jr. | 210/345 |
| 4,081,379 | 3/1978 | Smith | 210/342 |

FOREIGN PATENT DOCUMENTS

| | | | |
|---|---|---|---|
| 275383 | 8/1927 | United Kingdom | 210/323.2 |
| 369701 | 3/1932 | United Kingdom | 210/323.2 |

OTHER PUBLICATIONS

"GAF RB-4A Filter" (produced in 1974).

Primary Examiner—Richard V. Fisher
Assistant Examiner—Wanda L. Millard
Attorney, Agent, or Firm—James D. Hall

[57] ABSTRACT

An in-line strainer for liquids including a housing having an inlet which enters the housing at its side wall and turns upwardly within the housing and is in liquid communication with an opening in an upper wall of the housing. Filtering elements are suspended from openings in the upper wall such that liquid exiting the inlet at the opening on the upper wall flows through the filtering elements and out of the housing through an outlet in the housing side wall oppositely located from the filter inlet in the housing.

4 Claims, 4 Drawing Figures

IN-LINE STRAINER

This is a continuation of co-pending application Ser. No. 510,276 filed on July 1, 1983, now abandoned, which is a continuation of Ser. No. 362,872 filed on Mar. 29, 1982, now abandoned.

SUMMARY OF THE INVENTION

This invention relates to a strainer for liquids.

The strainer includes a housing having side and bottom walls and a top wall spaced from the bottom wall to define the interior of the housing. An outlet extends outwardly from the housing interior through the side wall. The top wall includes a first opening and second openings spaced about the first opening. A filtering element is removably suspended from each second opening within the housing interior. An inlet extends through the housing side wall and turns upwardly within the housing interior to the first top wall opening. A cover spans the housing top wall and has an inner surface that is spaced from the first or second top wall openings. Liquid flows through the inlet, between the cover and the housing top wall, through the filtering elements into the interior of the housing, and out through the outlet. The inlet and outlet are preferably substantially aligned opposite each other to allow installation of the filter within a liquid transfer line.

Accordingly it is an object of this invention to provide an in-line strainer for fluids.

Another object of this invention is to provide an in-line strainer for fluids which includes a housing having filtering elements suspended from a top wall, and an inlet and an outlet which allows liquid flow through the inlet and over the top wall, through the filtering elements and out of the housing through the outlet.

Another object of this invention is to provide an in-line filter having inlets and outlets substantially oppositely aligned to facilitate installation of the filter into a liquid-transfer line.

Other objects of this invention will become apparent upon a reading of the following description.

DESCRIPTION OF THE PREFERRED EMBODIMENT

Figure 1:
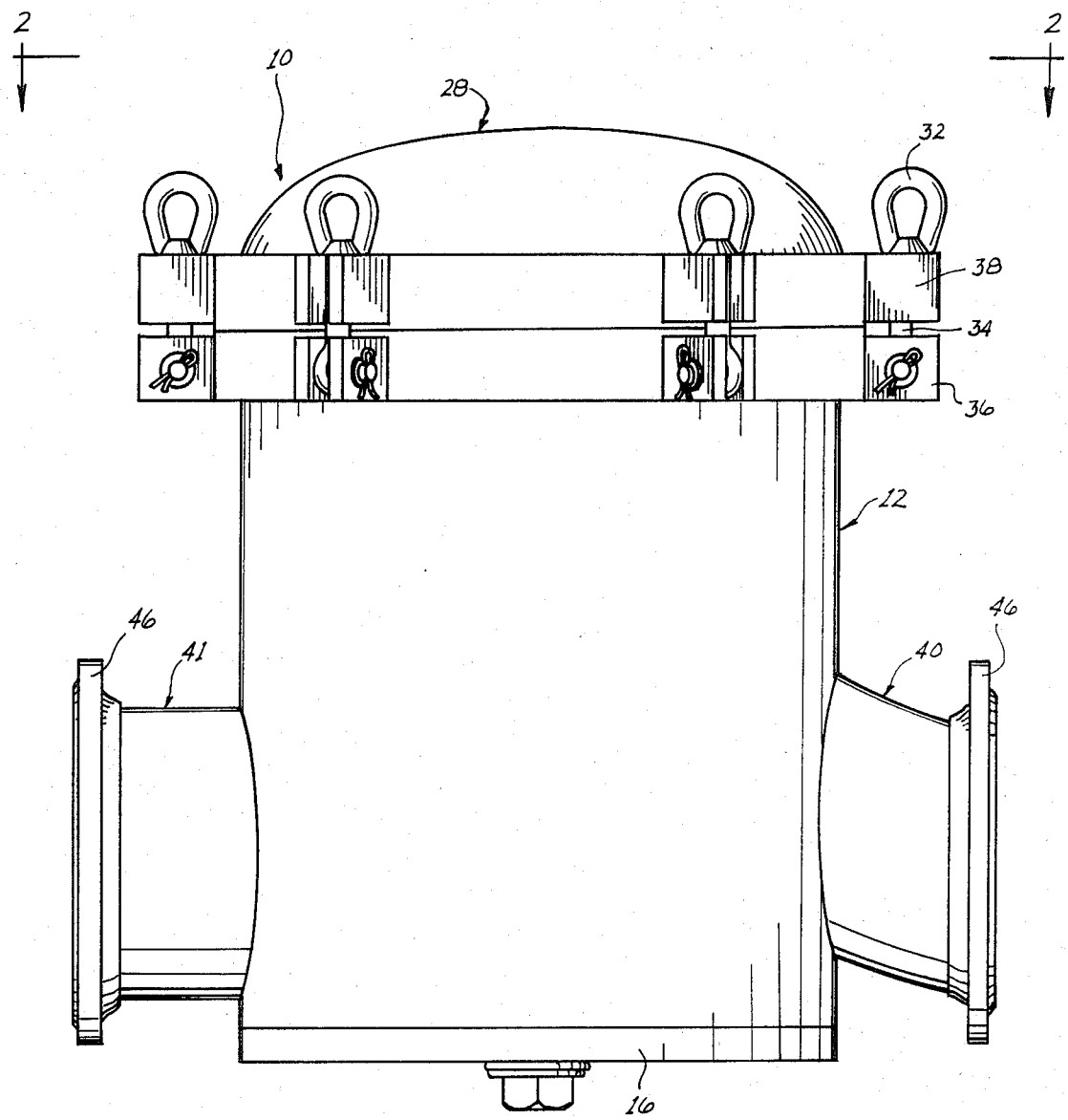
FIG. 1 is a side view of the strainer of this invention.
Figure 2:
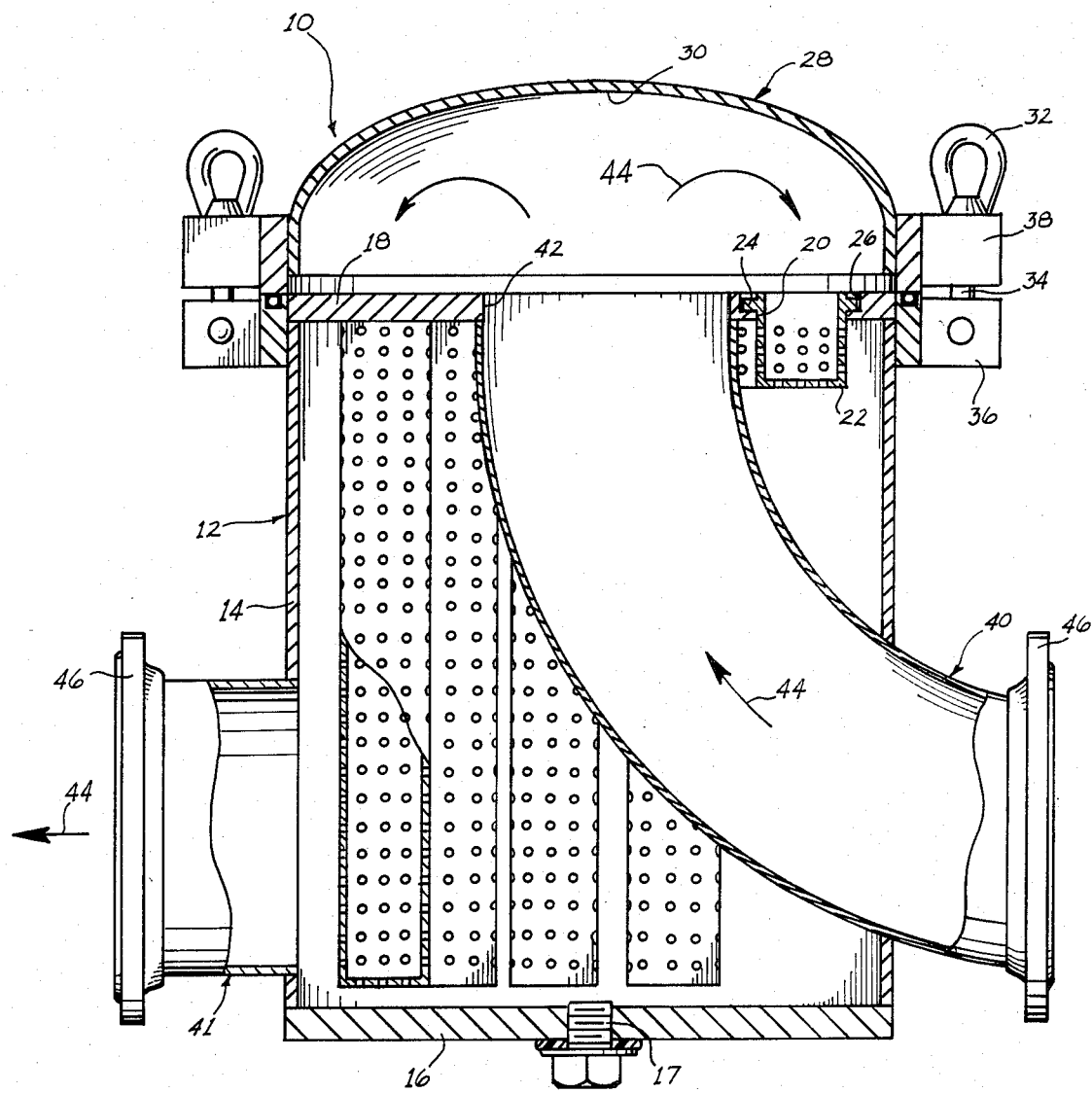
FIG. 2 is a vertical sectional view taken through the strainer.
Figure 3:
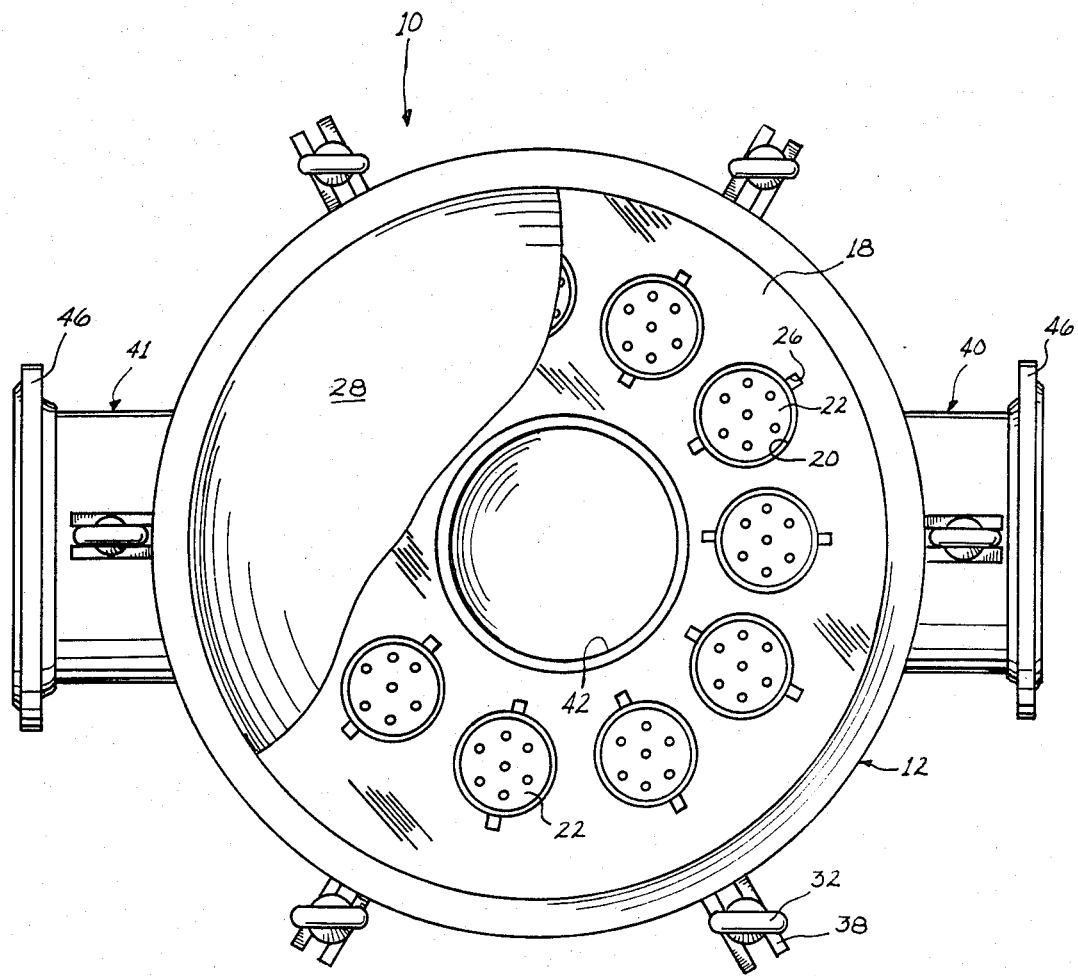
FIG. 3 is a top view of the filter with portions of the cover removed for purposes of illustration.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

The invention 10 of this invention includes a housing 12 which has a side wall 14, a bottom wall 16, and an upper wall 18. A drain plug 17 is threaded into bottom wall 16. Side wall 14, lower wall 16 and upper wall 18 define the interior of housing 12. Upper wall 18 has a circular series of openings 20 therein. A filtering element 22 is suspended within the interior of housing 12 from each opening 20. Filter elements 22 are preferably formed into a reticulated metal basket and are removably locked into housing openings 20 by tabs 24 which fit upon rotation of the filtering elements into undercut slots 26 formed in upper wall 18 at the peripheries of the openings.

A cover 28 spans upper wall 18 and has a domed inner surface 30 which is spaced above housing openings 20. Cover 28 is secured over housing upper wall 18 by hold down nuts 32 threaded onto rods 34 which are pivotally connected to brackets 36 on housing side wall 14.

Liquid flow through strainer 10 is accomplished with an inlet pipe 40 and an outlet pipe 41. Inlet pipe 40 extends through housing side wall 14 and turns upwardly within the interior of housing 12 to attach to upper wall 18 in liquid communication with an opening 42 in upper wall 18. Opening 42 is generally centrally located in upper wall 18. The lengths of several of the filtering elements 22 above inlet pipe 40 are shortened to accommodate passage of the inlet pipe 40 from side wall 14 to opening 42. Inlet and outlet pipes 40 and 41 include flanges 46 which are aligned and which may be attached at the opposed ends of the pipe in a liquid transfer line.

Figure 4:
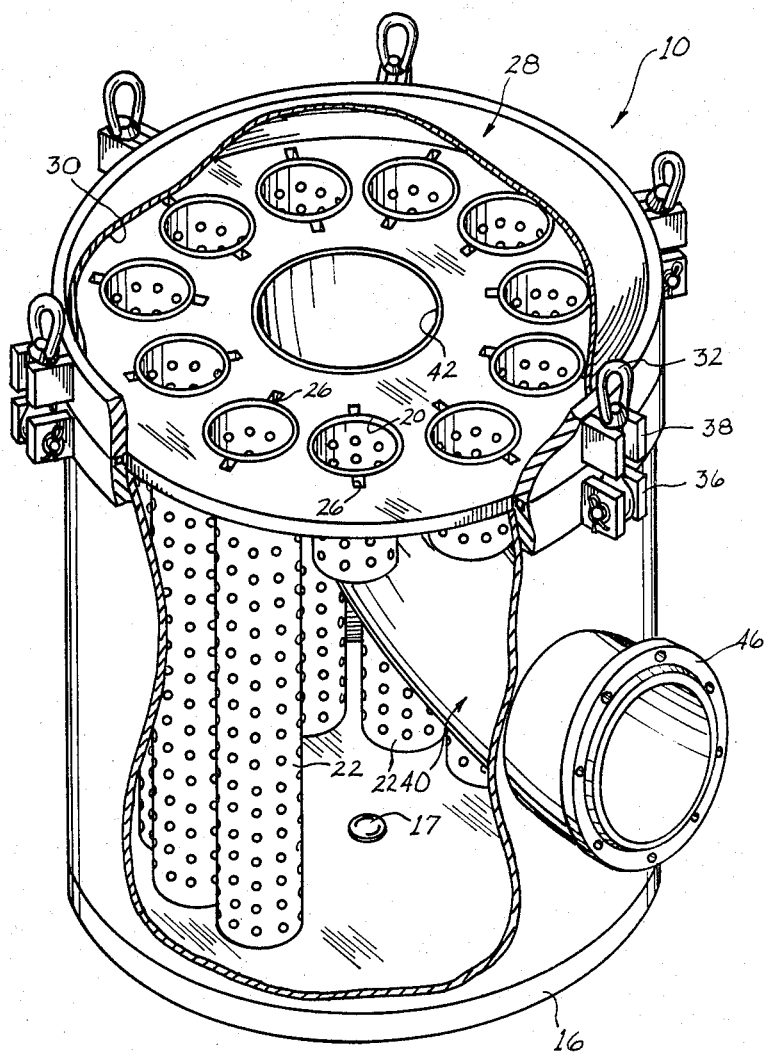
FIG. 4 is a perspective view of the strainer with portions of the cover and housing side wall broken away for purposes of illustration.

The path of liquid flow is indicated by arrows 44 in FIG. 4. Liquid enters strainer 10 through inlet 40 and is discharged through upper wall opening 42 above the upper wall. As the liquid accumulates above upper wall 18 under cover 28, it enters filtering elements 22 and passes through their reticulated baskets into the interior of housing 12 and out the housing through outlet pipe 41.

It is to be understood that the invention is not to be limited by the above description but may be modified within the scope of the appended claims.

What I claim:

1. In a strainer including a housing having side and bottom walls and a top wall, and top wall having means defining a first opening therein, said housing top wall having means defining a plurality of second openings radially spaced from said first opening, filtering means for straining a liquid removably suspended from each second opening, a cover spanning said housing top wall and having parts spaced from said first and second openings, means defining an outlet extending through said housing side wall and opening into the interior of said housing under said top wall, the improvement comprising means defining an inlet extending through said housing side wall and turning upwardly within said housing interior to said top wall first opening, whereby liquid passes from said inlet through said top wall first opening and over said housing top wall and under said cover and through said filtering means into the interior of the housing and out said outlet.

2. The strainer of claim 1 wherein each filtering means has a lower end, said inlet extending through said housing side wall at a level above the lower end of at least one said filtering means, at least one of said top wall second openings being spacedly located over said inlet within said housing interior, the filtering means suspended within those other top wall second openings located within said housing top wall at locations other than spacedly over said inlet.

3. The strainer of claim 1, wherein said outlet into said housing interior is aligned with said inlet where it extends through said housing side wall.

4. The strainer of claim 2 wherein said top wall first opening is centrally located in said top wall.

* * * * *